Patented June 20, 1939

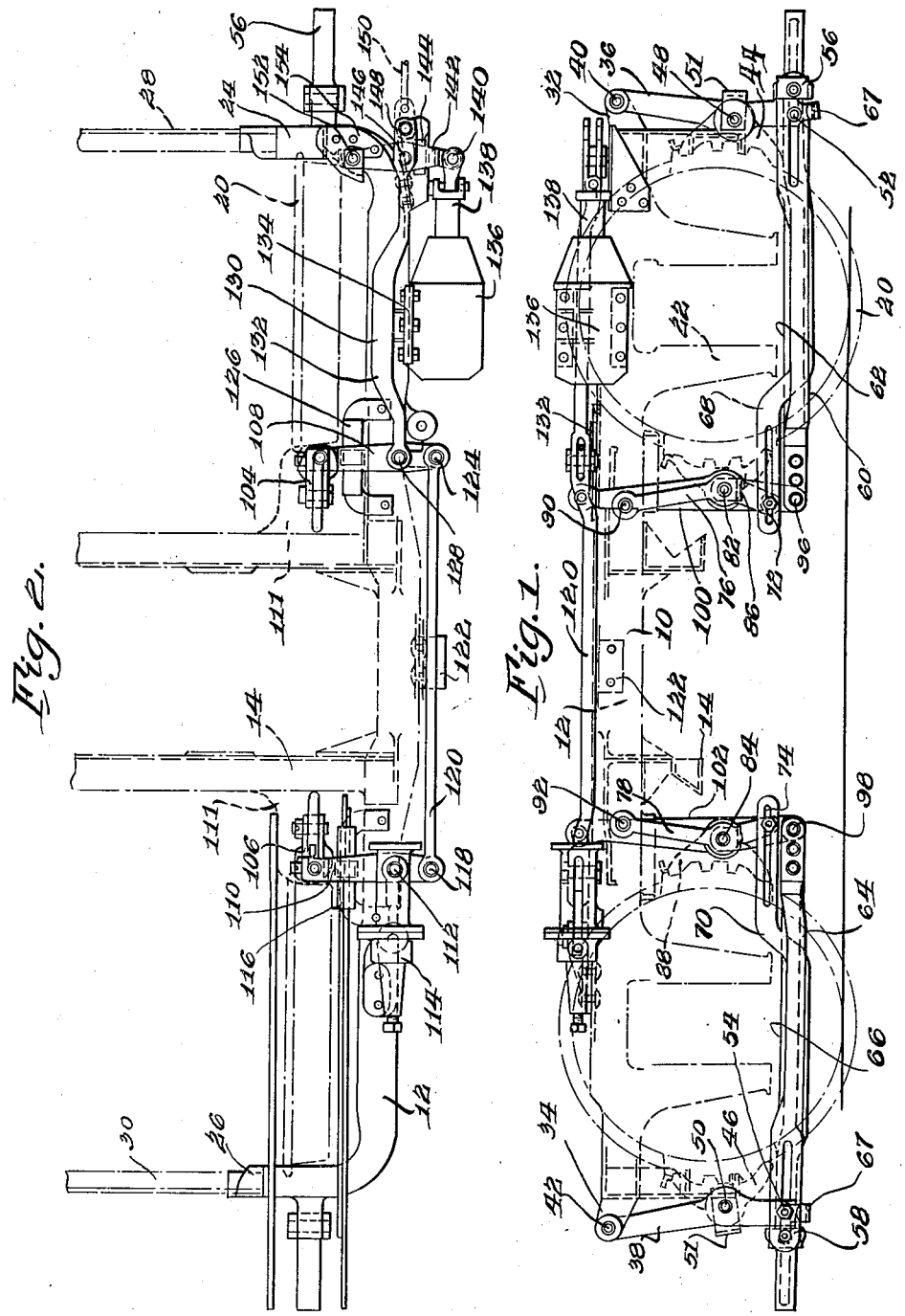

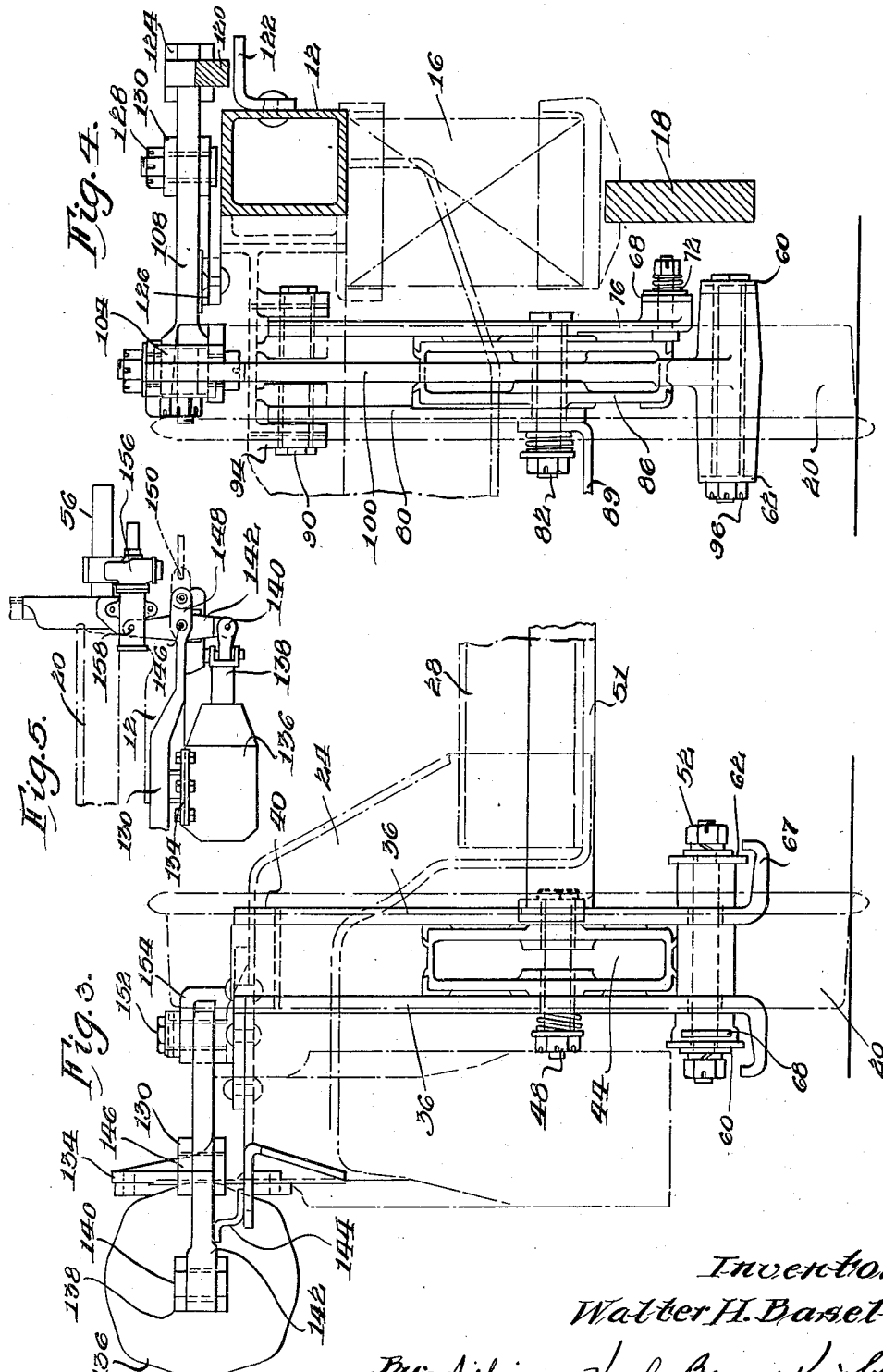

2,163,533

UNITED STATES PATENT OFFICE 2,163,533

BRAKE ARRANGEMENT

Walter H. Baselt, Chicago, Ill., assignor to American Steel Foundries, Chicago, Ill., a corporation of New Jersey Application March 27, 1937, Serial No. 133,466

8 Claims. (Cl. 188—56)

This invention pertains to a brake arrangement, and more particularly to a unit cylinder clasp brake.

It is an object of this invention to provide a unit cylinder clasp brake for high speed trains wherein a light but powerful system is used.

Another object is to provide a clasp brake mounted so that the center of gravity of the truck construction is not raised.

Still another object is to provide a supported clasp brake wherein slack adjusting means are provided at effective points in the system.

A different object is to provide a compact clasp brake wherein the operating means is so disposed that the overall width of the truck is not unduly increased.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation of a truck construction having a brake arrangement embodying the invention applied thereto;

Figure 2 is a fragmentary top plan view of the truck and brake construction illustrated in Figure 1;

Figure 3 is a fragmentary end elevation of the truck construction illustrated in Figures 1 and 2, the same looking toward the left as viewed in said figures;

Figure 4 is a transverse fragmentary sectional elevation taken transversely of the center line of the truck construction shown in Figures 1 and 2, the same looking toward the right as viewed in said figures;

Figure 5 is a fragmentary top plan view showing a modified form of cylinder lever connection.

In the truck construction illustrated, it is to be understood that the brake arrangement for each side of the truck is substantially the same, the cylinders preferably being located at the same end of the truck, and therefore only one side of said truck need be described.

The truck frame 10 includes the side frame 12, side frames at opposite sides of the truck being integrally connected by means of the spaced transoms 14 adapted to receive a suitable bolster (not shown), said bolster being supported in the usual way on the truck frame, said truck frame being supported on coil springs 16 disposed on an equalizer 18, the equalizer extending between journals of the wheel and axle assemblies 20. Any suitable journal means may be used, said journal means being received between the spaced pedestals 22 provided on said side frame. The side frame adjacent the ends thereof is provided with the depressed brackets 24 and 26, said brackets being connected at opposite sides of the truck by means of the end rails 28 and 30. The brackets 24 and 26 are provided with the end brake lever brackets 32 and 34, the dead brake levers 36 and 38 being pivoted thereto as at 40 and 42 adjacent the upper ends of said brake levers.

The brake levers 36 and 38 are provided intermediate the ends thereof with the brake heads 44 and 46 pivoted to the respective truck levers as at 48 and 50, the heads being provided with suitable brake shoes adapted for braking cooperation with the periphery of the adjacent wheels, and the truck levers at opposite sides of the truck are connected by the brake head tie straps 51. The lower ends of said truck levers 36 and 38 are pivotally connected as at 52 and 54 to the manual slack adjusters 56 and 58 provided on the outer and inner spaced connecting straps 60 and 62, and 64 and 66, the truck levers being flanged and reflanged as at 67 to provide safety means for said straps. The manual slack adjusters which are of well known construction as shown, for example, in U. S. Patent No. 1,124,813 are also provided with the adjuster bars 68 and 70 which are offset upwardly adjacent the inner ends thereof, and are pivoted through the pin and slot connections 72 and 74 to the lower end of the outer hanger levers 76 and 78. The outer hanger levers 76 and 78, and the inner hanger levers 80, are pivotally connected as at 82 and 84 to the inner brake heads 86 and 88 provided with suitable shoes having braking cooperation with the inner periphery of the adjacent wheels, and the hangers at opposite sides of the truck are connected by transverse brake head tie straps 89.

The upper ends of the inner and outer hanger levers are pivotally connected as at 90 and 92 to suitable brackets 94 provided on the truck frame. The inner ends of the connecting straps 60 and 62, and 64 and 66 are pivotally and adjustably connected as at 96 and 98 to the lower ends of the inner live truck levers 100 and 102, said levers being pivoted as at 82 and 84 to the brake heads 86 and 88, and being pivoted adjacent the upper ends thereof through suitable universal links 104 and 106 to the inner ends of the horizontal auxiliary levers 108 and 110, the upper ends of the live truck levers extending through suitable slots provided in the brackets 111 disposed between the side frame and transom.

The auxiliary lever 110 is a dead lever, being pivoted intermediate the ends thereof as at 112 to an automatic slack adjuster 114. The auxiliary lever 110 is provided with a suitable wear plate on the underside thereof for slidable support on the bracket 116 provided on the side frame. The outer end of the dead auxiliary lever is pivotally connected as at 118 to the pull rod 120 disposed outwardly of the truck frame. Said pull rod is adapted to be supported on the bracket 122 and is pivotally connected adjacent the other end thereof as at 124 to the outer end of the live auxiliary lever 108. The live auxiliary lever 108 is likewise provided with a suitable wear plate for slidable support on a bracket 126 provided on the side frame. The live auxiliary lever is pivoted intermediate the ends thereof as at 128 to a pull rod 130, said pull rod being adapted to be slidably supported on a suitable bracket provided on said truck frame. The pull rod 130 is offset inwardly as at 132 around a bracket 134, said bracket supporting an operating cylinder 136 secured thereto.

The cylinder 136 is provided with an operating piston 138 pivotally connected as at 140 to the outer end of the dead cylinder lever 142, said cylinder lever being adapted to be slidably supported on the bracket 144 provided on the truck frame. The cylinder lever is pivotally connected as at 146 to one end of the pull rod 130, said pull rod preferably being provided with an extension 148 adapted to be connected as at 150 to suitable hand operating means. The inner end of the dead cylinder lever is pivotally connected as at 152 to the bracket 154 provided on the bracket 24 of the side frame.

In the construction shown in Figure 5 it is contemplated that the automatic slack adjuster 114 be eliminated and a simple bracket connection provided on the side frame and pivoted to the dead auxiliary lever 110 at the pivot 112. The automatic slack adjuster is then provided on the bracket 24 at 156 and is pivotally connected as at 158 to the inner end of the cylinder lever 142.

In operation of the truck construction illustrated, assuming the brakes to be in released position, movement of the piston 138 toward the adjacent end of the truck, or movement of the hand operating means 150 in the same direction causes the cylinder lever 142 to be moved in a counter-clockwise direction, moving the pull rod 130 toward the right. Movement of the pull rod 130 toward the right causes pivotal movement of the live auxiliary lever 108 in a clockwise direction about the pivot 124 to cause the brake lever 100 to be moved to apply the inner brake shoe to the periphery of the adjacent wheel. The brake lever 100 will then be caused to be moved in a clockwise direction about the pivot 82 to cause the connecting straps 60 and 62 to move the outer dead brake lever in a clockwise direction about the pivot 40 to apply the outer brake shoe to the periphery of the adjacent wheel. Continued movement of the pull rod 130 toward the right will cause the pull rod 120 to be moved toward the right, whereupon the dead auxiliary lever 110 will be moved in a counter-clockwise direction about the pivot 112, causing the upper end of the live brake lever 102 to be moved toward the left to apply the inner brake shoe to the periphery of the adjacent wheel. The live brake lever 102 will then be moved in a counter-clockwise direction about the pivot 84 to cause the straps 64 and 66 to move the dead brake lever 38 in a counter-clockwise direction 42 about the pivot to apply the outer brake shoe to the periphery of the adjacent wheel. Release of the brake rigging, of course, will be effected in an opposite direction.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a brake arrangement, the combination of a truck frame, spaced wheels supporting said truck frame, brakes for said wheels, said brakes including a dead brake lever at each end of said truck frame, a live brake lever on the opposite side of each wheel from the dead brake lever, a connection between pairs of live and dead brake levers below the wheel centers, a slack adjuster supported on said truck frame adjacent one of said wheels, a dead auxiliary lever pivoted to said slack adjuster intermediate the ends thereof and adjacent the inner end to the adjacent live brake lever, a live auxiliary lever pivoted adjacent the inner end thereof to the other of said live brake levers, a connection between the outer ends of said live and dead auxiliary levers, an operating cylinder supported on said truck frame, a dead cylinder lever pivoted adjacent one end thereof to said truck frame adjacent an end of said truck frame, a connection between the piston of said cylinder and the other end of said cylinder lever, and a connection between said live auxiliary lever and said cylinder lever intermediate the ends of said levers.

2. In a brake arrangement, the combination of a truck frame, spaced wheels supporting said truck frame, brakes for said wheels, said brakes including a dead brake lever at each end of said truck frame, a live brake lever on the opposite side of each wheel from the dead brake lever, a connection between pairs of live and dead brake levers below the wheel centers, a dead auxiliary lever pivoted on said truck frame intermediate the ends thereof and adjacent the inner end to the adjacent live brake lever, a live auxiliary lever pivoted adjacent the inner end thereof to the other of said live brake levers, a connection between the outer ends of said live and dead auxiliary levers, an operating cylinder supported on said truck frame, a slack adjuster supported on said truck frame adjacent an end thereof, a dead cylinder lever pivoted adjacent one end thereof to said slack adjuster, a connection between the piston of said cylinder and the other end of said cylinder lever, and a connection between said live auxiliary lever and said cylinder lever intermediate the ends of said levers.

3. In a brake arrangement, the combination of a truck frame, spaced wheels supporting said truck frame, brakes for said wheels, said brakes including a dead brake lever at each end of said truck frame, a live brake lever on the opposite side of each wheel from the dead brake lever, a connection between pairs of live and dead brake levers, a slack adjuster supported on said truck frame adjacent one of said wheels, a dead auxiliary lever pivoted to said slack adjuster intermediate the ends thereof and adjacent the inner end to the adjacent live brake lever, a live auxiliary lever pivoted adjacent the inner end thereof to the other of said live brake levers, a connection between the outer ends of said live and dead auxiliary levers, an operating cylinder supported on said truck frame, a dead cylinder lever pivoted adjacent one end thereof to said truck frame adjacent an end of said truck frame, a connection between the piston of said cylinder and the other end of said cylinder lever, and a connection between said live auxiliary lever and said cylinder lever intermediate the ends of said levers.

4. In a brake arrangement, the combination of a truck frame, spaced wheels supporting said truck frame, brakes for said wheels, said brakes including a dead brake lever at each end of said truck frame, a live brake lever on the opposite side of each wheel from the dead brake lever, a connection between pairs of live and dead brake levers, a dead auxiliary lever pivoted on said truck frame intermediate the ends thereof and adjacent the inner end to the adjacent live brake lever, a live auxiliary lever pivoted adjacent the inner end thereof to the other of said live brake levers, a connection between the outer ends of said live and dead auxiliary levers, an operating cylinder supported on said truck frame, a slack adjuster supported on said truck frame adjacent an end thereof, a dead cylinder lever pivoted adjacent one end thereof to said slack adjuster, a connection between the piston of said cylinder and the other end of said cylinder lever, and a connection between said live auxiliary lever and said cylinder lever intermediate the ends of said levers.

5. In a brake arrangement, the combination of a truck frame, spaced wheels supporting said truck frame, brakes for said wheels, said brakes including a dead brake lever at each end of said truck frame, a live brake lever on the opposite side of each wheel from the dead brake lever, a connection between pairs of live and dead brake levers below the wheel centers, a slack adjuster supported on said truck frame adjacent one of said wheels, a dead auxiliary lever pivoted to said slack adjuster intermediate the ends thereof and adjacent the inner end to the adjacent live brake lever, a live auxiliary lever pivoted adjacent the inner end thereof to the other of said live brake levers, a connection between the outer ends of said live and dead auxiliary levers, an operating cylinder supported on said truck frame, a dead cylinder lever pivoted adjacent one end thereof to said truck frame adjacent an end of said truck frame, a connection between the piston of said cylinder and the other end of said cylinder lever, and a connection between said live auxiliary lever and said cylinder lever intermediate the ends of said levers, and hand operating means connected to said cylinder lever intermediate the ends thereof.

6. In a brake arrangement, the combination of a truck frame, spaced wheels supporting said truck frame, brakes for said wheels, said brakes including a dead brake lever at each end of said truck frame, a live brake lever on the opposite side of each wheel from the dead brake lever, a connection between pairs of live and dead brake levers, a slack adjuster supported on said truck frame adjacent one of said wheels, a dead auxiliary lever pivoted to said slack adjuster intermediate the ends thereof and adjacent the inner end to the adjacent live brake lever, a live auxiliary lever pivoted adjacent the inner end thereof to the other of said live brake levers, a connection between the outer ends of said live and dead auxiliary levers, an operating cylinder supported on said truck frame, a dead cylinder lever pivoted adjacent one end thereof to said truck frame adjacent an end of said truck frame, a connection between the piston of said cylinder and the other end of said cylinder lever, a connection between said live auxiliary lever and said cylinder lever intermediate the ends of said levers, and hand operating means connected to said cylinder lever.

7. In a brake arrangement, the combination of a truck frame, spaced wheels supporting said truck frame, brakes for said wheels, said brakes including pairs of connected brake levers adjacent each wheel, a connection between brake levers of adjacent wheels, operating means for said brakes including a cylinder lever, a slack adjuster provided on said truck frame and pivotally connected to said cylinder lever adjacent the inner end thereof, a cylinder supported on said truck frame, a connection between the piston of said cylinder and the outer end of said cylinder lever, and a connection from said brakes to the cylinder lever intermediate the end of said lever.

8. In a brake arrangement, the combination of a truck frame, spaced wheels supporting said truck frame, brakes for said wheels, operating means for said brakes including a cylinder lever, a slack adjuster provided on said truck frame and pivotally connected to said cylinder lever adjacent the inner end thereof, a cylinder supported on said truck frame, a connection between the piston of said cylinder and the outer end of said cylinder lever, and a connection from said brakes to the cylinder lever intermediate the end of said lever.

WALTER H. BASELT.